Dec. 9, 1941. G. F. KUEHN 2,265,293
GENERATOR AND METHOD OF MAKING THE SAME
Filed July 6, 1939 3 Sheets-Sheet 1
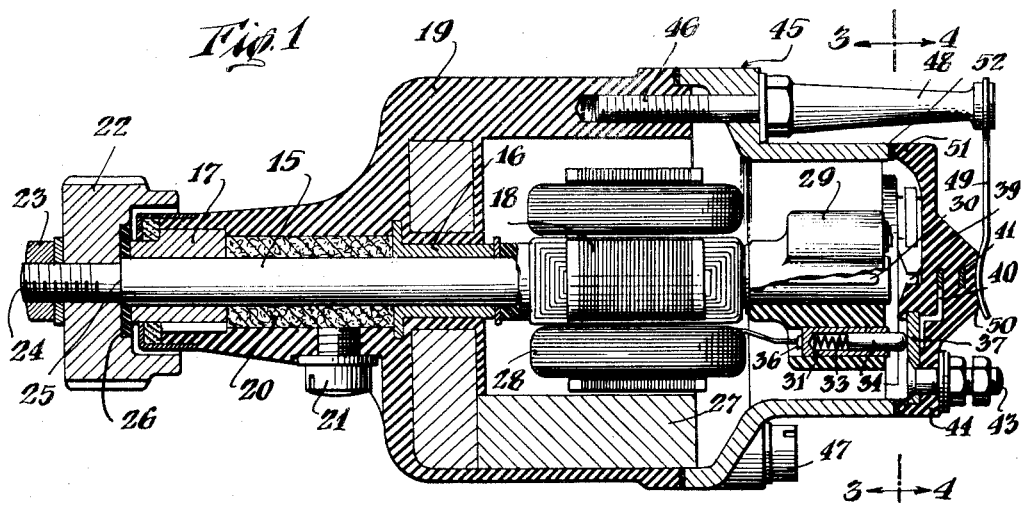
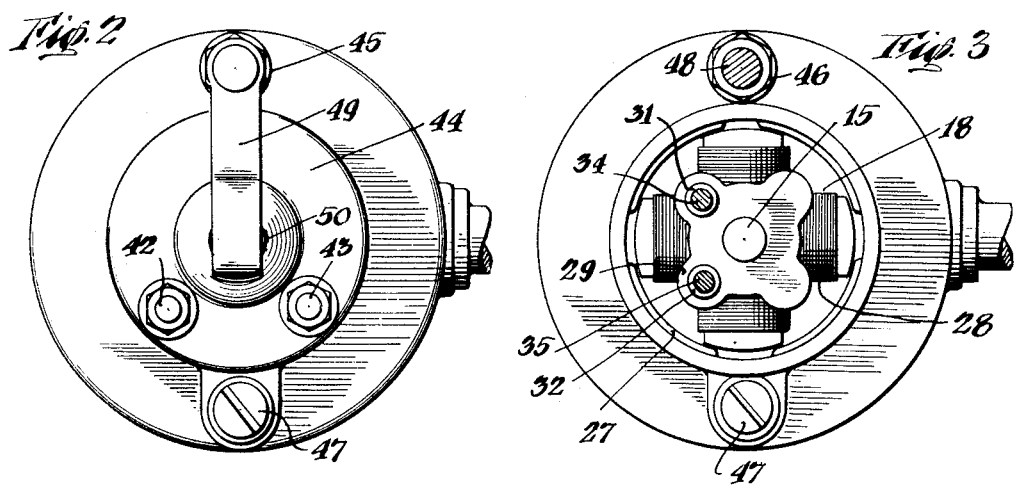
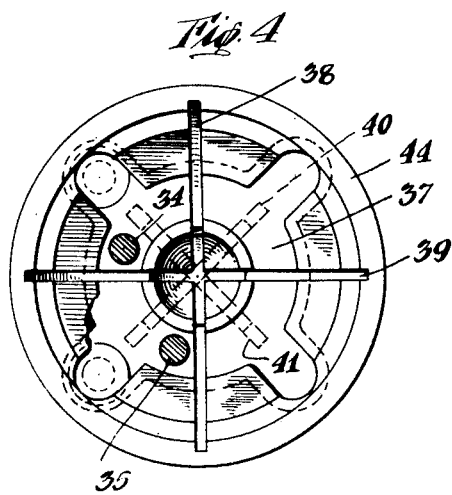
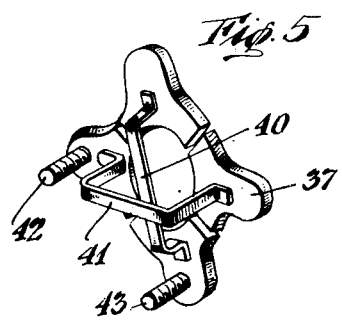
INVENTOR
George F. Kuehn
BY
Duell, Kane & Smoot
ATTORNEYS

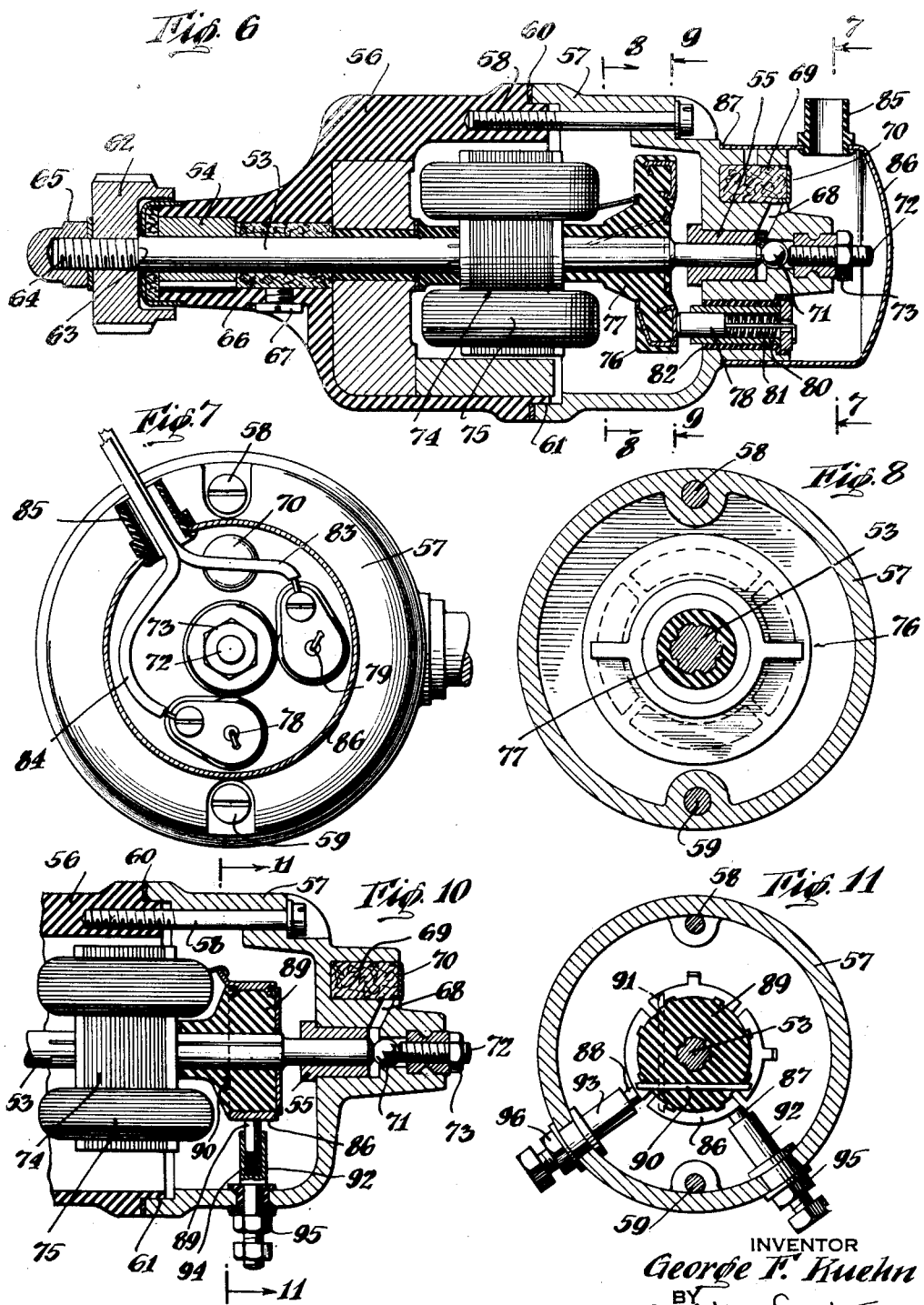

Dec. 9, 1941.  G. F. KUEHN  2,265,293
GENERATOR AND METHOD OF MAKING THE SAME
Filed July 6, 1939  3 Sheets-Sheet 3
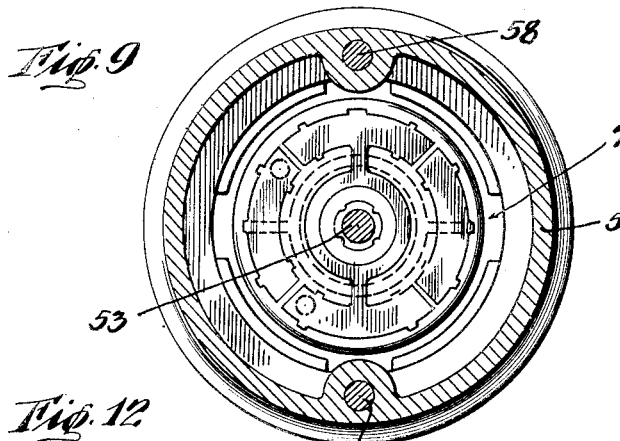
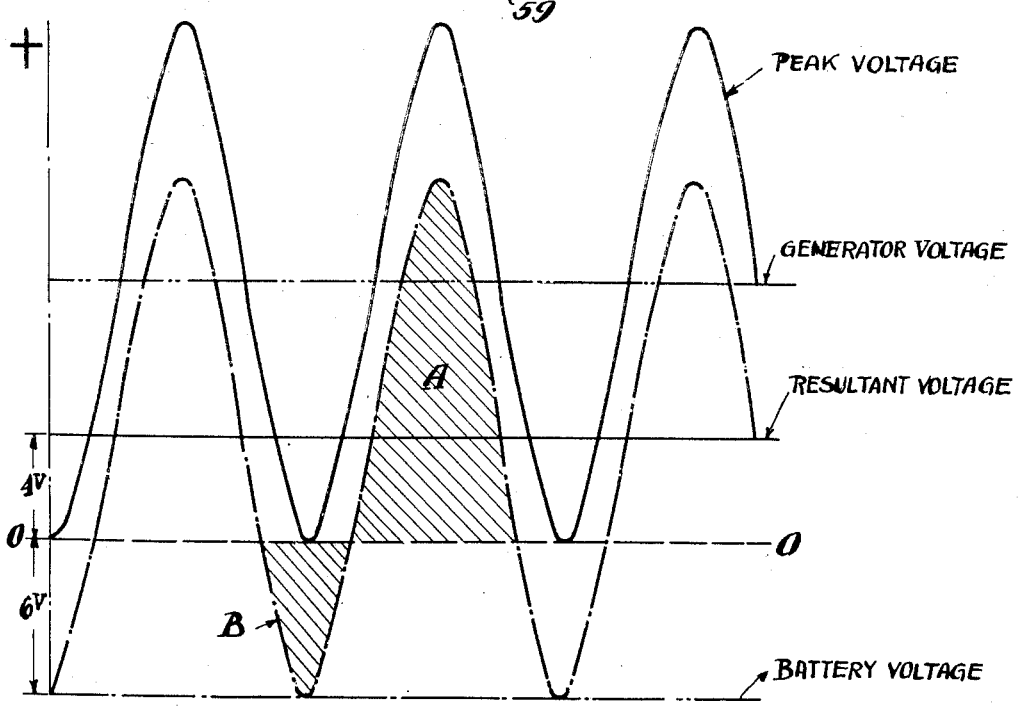
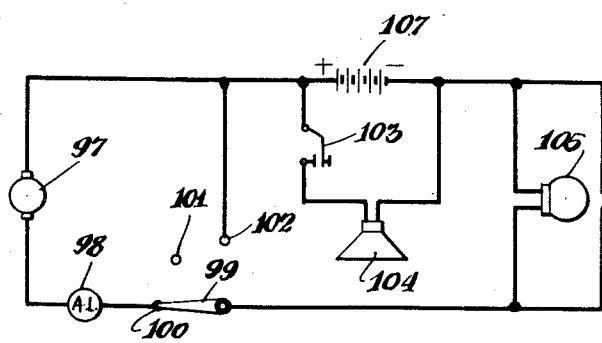
INVENTOR
George F. Kuehn
BY
Duell, Kane & Smoot
ATTORNEYS Patented Dec. 9, 1941

2,265,293

UNITED STATES PATENT OFFICE 2,265,293

GENERATOR AND METHOD OF MAKING THE SAME

George F. Kuehn, Jackson Heights, N. Y., assignor to E. A. Laboratories, Inc., Brooklyn, N. Y., a corporation of New York Application July 6, 1939, Serial No. 283,025

3 Claims. (Cl. 171—209)

This invention relates to an improved electrical system especially adapted to supply current under load conditions of considerable range and designed to function with a minimum of weight and space requirements.

The invention as well relates to an improved direct current generator for use in such electrical system.

It is an object of the invention to produce a system and generator therefor which will be relatively rugged and simple in design and construction and which will operate over long periods of time with freedom from mechanical difficulty.

Another object is that of providing an electric system employing a battery or the like for supplying electric current when the generator is not functioning and in which the generator, when functioning, recharges said battery while at the same time supplying the load demands of the system.

Other objects will be apparent when reference is had to the attached sheets of drawings and in which:

Fig. 1 represents a cross section through a generator embodying one form of my invention;

Fig. 2 is an end view of the generator shown in Fig. 1 looking from right to left;

Fig. 3 is a sectional end view of the generator shown in Fig. 1 taken along the line 3—3 in that view and looking in the direction of the arrow;

Fig. 4 is a further sectional view taken through the generator shown in Fig. 1 along the line 4—4 and in the direction of the arrows;

Fig. 5 is a perspective view of the commutator utilized in the foregoing generator showing the connecting strips in place;

Fig. 6 is an elevation in cross section of a further type of generator embodied in the form of my invention and which is primarily designed for heavy duty operation;

Fig. 7 is a sectional view taken through the generator shown in Fig. 6 along the line 7—7 in that figure and looking in the direction of the arrows;

Fig. 8 is a further sectional view of the generator shown in Fig. 6 taken along the line 8—8 of that figure and looking in the direction of the arrows;

Fig. 9 is still another section taken along the section of the generator shown in Fig. 6 taken along the line 9—9 in that figure looking in the direction of the arrows;

Fig. 10 is a fragmentary section through the generator, or through a generator of the same general type, as is shown in Fig. 6 but in which a modified type of commutator assembly has been utilized; and Fig. 11 is a section taken through the generator shown in Fig. 10 along the line 11—11 in that figure and looking in the direction of the arrow.

Turning primarily to Fig. 12, there is illustrated a graphic representation of the operation of any of the generators heretofore shown or of any type generator embodying my invention and disclosing the resultant voltage during cycles of operation, and in Fig. 13 we have schematic wiring diagram for an electrical system according to my invention and which preferably utilizes a generator and general characteristics embodied in the generator shown in the preceding views.

In considering first the generator embodied in Figs. 1 through 5, there has been illustrated a generator adapted for light out-put and in which the rotor shaft 15 is supported by two bearing members 16 and 17 both forward of the rotor 18. The bearings are preferably mounted in the generator housing 19 and are spaced from one another as has been shown.

Felt, or other suitable material 20 may be packed around the rotor shaft, in the space between the two bearings. The packing is impregnated with oil or other lubricant so that the shaft may operate over long periods of time without attention. A screw 21 may be provided to give access to the packing material 20 for the purpose of relubricating, should this become necessary.

Associated with the end of the rotor shaft that projects beyond the housing is a driving wheel 22 which, for example, may engage the wheel of a bicycle or be actuated in any other suitable fashion. This wheel is to be held on the shaft, as shown, by means of a nut 23 which engages a screw threaded reduced portion of shaft 24. The wheel 22 is thus held against the shoulder 25 formed at the termination of the reduced shaft portion and will accordingly be spaced from the end of the generator housing.

A bushing may be provided, as has been shown, to keep the bearing 17 free from dirt and other foreign material. The generator housing is provided with the usual stator 27 surrounding the rotor and which may be secured to the housing at the time that the latter is formed, for example, by die-casting the housing about the stator or in any other suitable fashion. One method of assembling a stator within the housing has been fully described in my co-pending application, Serial Number 247,170, filed December 22, 1938. The generator rotor is provided with windings 28 encircling each of the four arms of the rotor, it being noted in this connection that the rotor itself is preferably made up of laminated metal of high magnetic properties all in accordance with conventional practice. Beyond the rotor at the unjournaled end of the rotor shaft is positioned an armature 29 which may be formed of Bakelite or other suitable non-conductor mounted about said shaft which may, for example, have struck up ridges 30 on its surface to key into said plastic and firmly position the same. Embedded in said armature are brush sockets 31 and 32 each formed with a coil spring 33 and brushes 34 and 35. The brushes are designed to ride in said brush sockets against the pressure of the spring members. The ends of the rotor windings 28 are connected to said brush sockets as at 36. Beyond said armature is located a stationary commutator ring 37 which is divided into quarter segments by means of spacing slots 38 and 39 which bi-sect said commutator ring at right angles to one another.

The opposed quadrants are connected with one another by conducting bridging members 40 and 41 and two of the adjacent quadrants are provided with terminal posts 42 and 43. The commutator ring and terminal posts are embedded in a non-conductive cover plate 44 which serves to hold the same together as a unitary structure.

Associated with the generator housing 19 is a tail piece 45 which extends rearwardly to a point adjacent the rear edge of the armature. It is preferably secured to the housing by means of bolts 46' and 47'. Integral with the former is a post 48 extending rearwardly therefrom and carrying a downwardly depending spring arm 49 which engages the rear surface of the commutator cover plate 44 at 50, thus holding the latter in place. The cover plate has a flange 51 which abuts against the rear edge of the member 45 and a gasket 52 may be provided to afford a seal between the two members.

Now turning to Figs. 6 through 11, there is illustrated a modified type of generator in which the rotor shaft 53 is positioned in bearings 54 and 55 located at opposite ends of said shaft. Such bearings are carried by the half sections 56 and 57 respectively of the generator housing in accordance with usual practice and the housing sections are held together by means of screw threaded bolts 58 and 59.

A gasket 60 may be provided at the point of abutment between the two housing sections and the sections may additionally be provided with complementary shoulder portions as at 61 for engagement one with the other for the purpose of rigidifying the connection.

The shaft 53 has associated with one end thereof the driving wheel 62 which is again held in place against the shoulder 63 of the reduced screw threaded end portion of said shaft 64 by means of a nut 65. In addition, said shaft is preferably surrounded by a packing, of felt or the like, 66, adjacent to the bearing 54, said packing being positioned in a cavity in the generator housing provided for that purpose as has heretofore been described in connection with the preceding views. This packing is impregnated with oil or other suitable lubricant which can be replenished through means of the access screw 67. The other bearing 55 is lubricated by means of an opening 68 leading from a lubricant reservoir 69 formed in the housing at the opposite end of the shaft at the point where it is journaled in the bearing. A cap 70 affords access to the storage recess for replenishment of the lubricant.

A ball bearing 71 may be provided at the rear of the rotor shaft to take up the end thrust of said shaft and adjustment between said ball bearing and the end of said rotor shaft may be maintained by means of the screw threaded stub shaft 72 acting against the ball bearing and being locked in position by means of the nut 73. The rotor shaft is provided with the conventional type laminated rotor 74 on which are positioned rotor windings 75, the ends of said windings being secured to segments of a commutator 76 which is embedded in a non-conductive flange 77 secured to the rotor shaft.

The commutator ring 76 is so positioned that its contact face extends rearwardly and the ring is divided into quadrants, the opposed quadrants being electrically connected, and being insulated from adjacent quadrants.

A pair of brushes 78, are provided and which contact adjacent quadrants in said commutator ring simultaneously. Said brushes are mounted in brush receiving sockets 80 which carry springs 81 which maintain said brushes under tension against the face of said commutator. The brush sockets are carried by the rear generator housing but are surrounded by insulated material 82. Lead wires 83 and 84 are associated with said brush sockets for the purpose of conducting the current away from said generator as it is produced. Said lead wires are carried through a bezel 85 in a cap 86 which is provided for slip-fit engagement with the rear of the generator housing as at 87.

In Figs. 10 and 11 the commutator ring 86 is positioned at the periphery of the commutator instead of on the rear face thereof and brushes 87 and 88 engage adjacent quadrants thereof in the same manner as has heretofore been described. The commutator ring is mounted in insulated material 89 and opposed quadrants are joined together by bridging members 90 and 91, in accordance with the practice heretofore employed in the preceding views, the adjacent quadrants being, of course, insulated one from the other. Brushes are carried by brush receiving sockets 92 and 93 and springs 94 are positioned within said sockets for urging said brush members into contact with said commutator. Terminal members 95 and 96 are likewise provided for carrying said current away from said commutator as it is produced.

Fig. 12 is a graphic representation of the flow of generator and battery current, when a generator such as has been heretofore described is used in series with a conventional battery of the wet or storage type. Illustrated are various steps of current flow during the entire operating cycle of the generator; the peak voltage occurs when the generator is functioning alone, while the algebraic sum of the generator and battery voltages acting together is shown as a resultant voltage curve. It will thus be seen during peak operation of the generator that there will be sufficient current, not alone to operate the accessories desired, but also to recharge the battery which is in series therewith. In other words the generated watts minus the lamp watts will equal the wattage available for charging the battery, or as shown in Fig. 12, area A minus area B equals the power available in this connection. Of course, as the generator output varies with the speed, the battery will be recharged only at certain periods of operation. Thus, as illustrated, the alternating current is transformed into a pulsating D. C. current.

Fig. 13 shows a diagrammatic wiring plan utilizing the type of the generator described in a conventional circuit with a storage battery in series. The generator is represented at 97 and an ammeter indicator may be positioned at 98, as well as a switch 99 provided with three terminal members 100, 101, and 102. An auxiliary switch member 103 in parallel with two balls may also be provided for controlling an independent horn circuit which operates a warning signal shown at 104. Incandescent lamps 105 and 106 may also be included in the circuit and a storage battery 107 is connected in series with the circuit. By moving the switch to terminal 100, the generator supplies current to the lamps and the horn, while at the same time surplus voltage produced by the generator is utilized in recharging the battery. With the switch placed at terminal 101, the generator does not function and the storage battery supplies current for the horn alone. With the switch moved to contact terminal 102 the storage battery supplies all current requirements for the lamps as well as the horn, and the generator is again not utilized. It will thus be apparent that this type of installation utilized, for example, in connection with a bicycle lamp and horn assembly, provides means for supplying current to the various appliances when the vehicle is in motion and the generator functioning, or when the vehicle is at rest, by the simple expedient of moving the switch to the desired position.

It is apparent that changes in construction and rearrangement of the parts might be resorted to without in the slightest departing from the spirit of the invention as heretofore described.

I claim:

1. A generator including in combination, a casing, a shaft extending from within said casing to a point beyond the same, a driving member affixed to said shaft and at a point beyond said casing, a stator disposed within said casing and fixed with respect to the same, a rotor secured to said shaft and disposed adjacent said stator, a commutator assembly associated with said rotor, said assembly comprising electrically insulated quadrant sections and rigid strap members electrically connecting opposed quadrants.

2. A generator including in combination, a casing, a shaft extending from within said casing to a point beyond the same, a driving member affixed to said shaft and at a point beyond said casing, a stator disposed within said casing and fixed with respect to the same, a rotor secured to said shaft and disposed adjacent said stator, a commutator assembly associated with said rotor, said assembly comprising electrically insulated quadrant sections and rigid U-shaped strap members electrically connecting opposed quadrants.

3. A generator including in combination, a casing, a shaft extending from within said casing to a point beyond the same, a driving member affixed to said shaft and at a point beyond said casing, a stator disposed within said casing and fixed with respect to the same, a rotor secured to said shaft and disposed adjacent said stator, a commutator assembly associated with said rotor, said assembly comprising electrically insulated quadrant sections and rigid rearwardly extending U-shaped strap members electrically connecting opposed quadrants.

GEORGE F. KUEHN.